(12) United States Patent
Hernandez-Maldonado et al.

(10) Patent No.: US 12,515,195 B2
(45) Date of Patent: Jan. 6, 2026

(54) BI-METALLIC PILLARED-LAYERED COORDINATION POLYMERS FOR CARBON DIOXIDE REMOVAL

(71) Applicant: University of Puerto Rico, San Juan, PR (US)

(72) Inventors: Arturo J. Hernandez-Maldonado, Mayaguez, OR (US); Alberto Tous-Granados, Barranquilla (CO)

(73) Assignee: University of Puerto Rico

( * ) Notice: Subject to any disclaimer, the term of this patent is extended or adjusted under 35 U.S.C. 154(b) by 340 days.

(21) Appl. No.: 18/361,319

(22) Filed: Jul. 28, 2023

(65) Prior Publication Data

US 2024/0042415 A1 Feb. 8, 2024

Related U.S. Application Data

(60) Provisional application No. 63/416,072, filed on Oct. 14, 2022, provisional application No. 63/393,692, filed on Jul. 29, 2022.

(51) Int. Cl.
*B01D 53/02* (2006.01)
*B01J 20/22* (2006.01)
*B01J 20/30* (2006.01)
*B01J 20/34* (2006.01)

(52) U.S. Cl.
CPC ............ *B01J 20/226* (2013.01); *B01D 53/02* (2013.01); *B01J 20/3085* (2013.01); *B01J 20/3425* (2013.01); *B01J 20/3491* (2013.01); *B01D 2253/204* (2013.01); *B01D 2257/504* (2013.01); *B01D 2259/40088* (2013.01)

(58) Field of Classification Search
CPC ........ B01D 2253/204; B01D 2257/504; B01D 2259/40088; B01D 53/02; B01J 20/226; B01J 20/3085; B01J 20/3425; B01J 20/3491; Y02C 20/40
See application file for complete search history.

(56) References Cited

U.S. PATENT DOCUMENTS

2011/0021341 A1* 1/2011 Matzger ............... B01J 20/3483
 208/240
2022/0153757 A1* 5/2022 Falkowski ............ C07F 19/005

FOREIGN PATENT DOCUMENTS

JP 2004196594 A * 7/2004

OTHER PUBLICATIONS

Translation of JP2004196594 A (Year: 2004).*

* cited by examiner

*Primary Examiner* — Christopher P Jones
(74) *Attorney, Agent, or Firm* — McDonnell Boehnen Hulbert & Berghoff LLP

(57) ABSTRACT

A bi-metallic coordination polymer comprising a transition metal and an alkaline earth metal is provided. In one aspect, the present disclosure provides a coordination polymer comprising a plurality of two-dimensional sheets, wherein the two-dimensional sheets arranged in parallel and comprising a plurality of transition metal cations coordinated by carboxylate-bearing ligands; and a plurality of pillars, wherein each pillar connects two adjacent two-dimensional sheets, and wherein each pillar is comprised of an alkaline earth metal coordinated to at least one β-diketonate moiety.

20 Claims, 9 Drawing Sheets

BI-METALLIC PILLARED-LAYERED COORDINATION POLYMERS FOR CARBON DIOXIDE REMOVAL

CROSS-REFERENCE TO RELATED APPLICATIONS

This application claims priority to U.S. Provisional Application No. 63/393,692, filed Jul. 29, 2022, and U.S. Provisional Application No. 63/416,072, filed Oct. 14, 2022, the disclosures of which are each explicitly incorporated by reference herein.

STATEMENT REGARDING FEDERALLY SPONSORED RESEARCH

The claimed invention was made with U.S. Government support under grant number DMR-1827894 awarded by the National Science Foundation (NSF). The government has certain rights in this invention.

FIELD

The present disclosure relates to bimetallic pillared-layer coordination polymers, and in particular their application for the removal of carbon dioxide from a gaseous mixture. The present disclosure also provides methods for preparation thereof.

BACKGROUND

Highly porous materials such as activated carbons and zeolites is an active area of research as their high internal surface areas allow, for a given set of pVT parameters, increased gas storage in an adsorbent-filled tank compared to an empty one. Typical applications of gas storage have focused on storage for energy applications, such as the storage of hydrogen or methane. However, given the increased global efforts to control carbon dioxide emissions, the development of highly porous materials which can efficiently store and release carbon dioxide is of increased importance.

Adsorption-based storage of carbon dioxide possesses advantages for both safety and economic reasons as high pressures and the associated high energy input can be avoided while maintaining a large storage capacity. In order to facilitate adsorption, storage, and subsequent release, adsorbents should exhibit steep, linear, and reversible gas uptake isotherms. Additionally, selectivity for carbon dioxide is critical, as it is often admixed with other gases and, being relatively non-polar, does not interact strongly with many compositions.

Metal-Organic Frameworks (MOFs) have become increasingly important materials for industrial and environmental applications due to exceptional chemical and textural properties. These properties make MOFs outstanding candidates in fields such as gas storage and delivery, separation technologies and catalysis, luminescence, biomimetic applications, drug delivery, and chemical sensing.

Accordingly, there remains a need to develop new MOF compositions and methods for the selective uptake and storage of gases, including carbon dioxide.

SUMMARY

The present disclosure relates to bimetallic coordination polymers, in particular their use in the selective uptake of carbon dioxide.

Accordingly, one aspect of the present disclosure provides for a coordination polymer, comprising:
a plurality of two-dimensional sheets, wherein the two-dimensional sheets are arranged in parallel, and each comprise a plurality of transition metal cations coordinated by carboxylate-bearing ligands;
a plurality of pillars, wherein each pillar connects two adjacent two-dimensional sheets, and wherein each pillar is comprised of an alkaline earth metal coordinated to at least one β-diketonate moiety.

In another aspect, the present disclosure provides for a method of making a coordination polymer, the method comprising:
providing an alkaline earth metal-containing compound comprised of an alkaline earth metal coordinated to at least one β-diketonate moiety;
in a solvent, mixing the alkaline earth metal-containing compound with a carboxylate-bearing ligand, where the carboxylate-bearing ligand may be protonated or a salt; adding a transition metal salt and allowing the mixture to react.

In another aspect, the present disclosure provides for a method of adsorbing carbon dioxide, the method comprising:
providing the coordination polymer as otherwise described herein; and
contacting the coordination polymer with a gaseous mixture, where the gaseous mixture comprises $CO_2$, and wherein the coordination polymer uptakes at least a portion of the $CO_2$ in the gaseous mixture.

Other aspects of the disclosure will be apparent to those skilled in the art in view of the description that follows.

DETAILED DESCRIPTION

Figure 1:
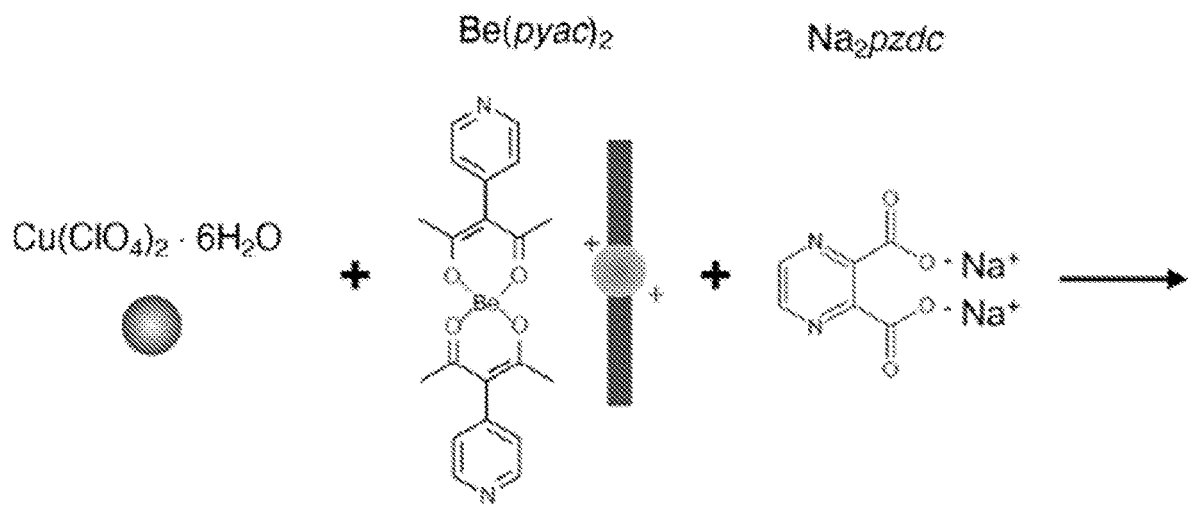
FIG. 1: Schematic representation for the assembly of $Cu_2(pzdc)_2(Be(pyac)_2)$.
Figure 1:
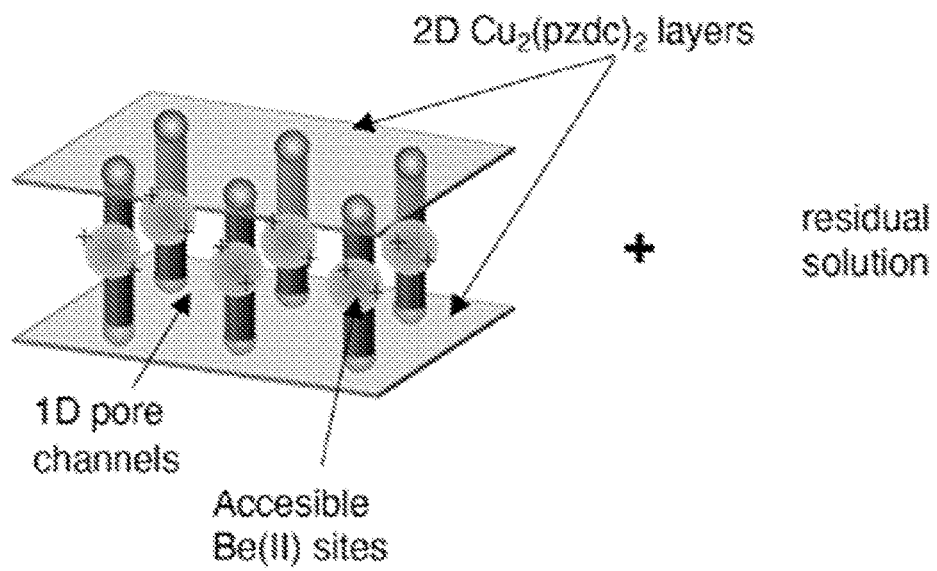

MOF materials include porous coordination polymers (PCPs), which are formed by the combination of a number of layers connected by a wide variety of pillar-like ligands. For example, the layered framework Cu(pzdc) (pzdc=pyrazine-2,3-dicarboxylate) with variety of pillar ligands, often with pyridyl-type linkages. PCPs with copper nodes have been developed by Kitagawa and co-workers. These frameworks consist of 3-D structures that exhibit a 1-D pore channel system. Past experiments have attempted to increase the interaction with a range of adsorbates, such as by adding a carbonyl group into the ligand N-(4-pyridyl-isonicotinamide).

$Cu_2(pzdc)_2(L)$ materials also displayed concomitant structural changes that arise upon the inclusion of guest molecules or through changes in pressure and/or temperature. For example, $Cu_2(pzdc)_2(bpy)$ (bpy=4,4'-bipyridine) undergoes pore contraction upon the adsorption of guest benzene and water.[22] $Cu_2(pzdc)_2(bpy)$ also undergoes substantial structural changes upon an increase in temperature as evidenced by in situ high-temperature X-ray powder diffraction (XRD) and $^{13}C$ cross-polarization magic angle spinning nuclear magnetic resonance. The results suggest long and local-range changes in the channels of the structure due to an apparent local framework distortion giving as consequence a surface area reduction from 633 $m^2/g$ at 373 K to 123 $m^2/g$ at 423 K. Similar results have been reported for other $Cu_2(pzdc)_2(L)$ materials, for example, with L=4-4'-azopyridine; 1,2-di(4-pyridyl)-ethylene; N-(4-pyridyl-isonicotinamide); or 1,2-di(4-pyridyl)-glycol. On the other hand, $Cu_2(pzdc)(bpy)$ was found to exhibit a long-range structural change upon $CO_2$ uptake at moderate pressure and ambient temperature. According to a set of in situ XRD adsorption tests, the structural changes are apparently linked to a combination of local changes induced by adsorbate-adsorbent interactions and external forces being exerted onto the crystals. However, much of the past work has focused on modification to the ligands, and new approaches are needed.

The present work seeks to introduce accessible metal sites into the metal-organic framework in order to modulate analyte uptake, such as gaseous species like carbon dioxide. The present inventors have surprisingly determined that this approach can lead to tunable and selective gas uptake at moderate pressures and temperatures.

Accordingly, one aspect of the present disclosure provides for a coordination polymer, comprising:
 a plurality of two-dimensional sheets, wherein the two-dimensional sheets are arranged in parallel, and each comprise a plurality of transition metal cations coordinated by carboxylate-bearing ligands;
 a plurality of pillars, wherein each pillar connects two adjacent two-dimensional sheets, and wherein each pillar is comprised of an alkaline earth metal coordinated to at least one β-diketonate moiety.

Coordination polymers are generally known in the art. In general, coordination polymers are infinite arrays of repeating units, comprised of metal ions linked by organic ligands. The metal ions themselves may have further terminal ligands or may be fully coordinated by the bridging ligands. Coordination polymers are ideally crystalline but may be poorly crystalline or even amorphous. Coordination polymers with significant porosity are sometimes referred to as metal-organic frameworks.

The carboxylate-bearing ligand bind to the transition metal cations and act as bridging ligands between adjacent metal cations. Accordingly, in various embodiments as otherwise described herein, the carboxylate-bearing ligand has a plurality of carboxylate groups, for example, is a dicarboxylate. The carboxylate-bearing ligand may also possess other functional groups which can aid to form the coordination polymer structure. As such, in various embodiments as otherwise described herein, the carboxylate-bearing ligand comprises a nitrogen-containing heterocycle. For example, the carboxylate-bearing ligand may include a pyridine, pyrazine, or pyrimidine group. In particular embodiments as otherwise described herein, the carboxylate-bearing ligand comprises pyrazine. In certain embodiments, the carboxylate group or groups are directly attached to the nitrogen-containing heterocycle. For example, in certain embodiments as otherwise described herein, the carboxylate-bearing ligand is pyrazine-2,3-dicarboxylate (referred to herein as pzdc).

Various transition metals may be suitable for forming the coordination polymer as described herein. For example, in certain embodiments as otherwise described herein, the transition metal cation is cobalt, copper, nickel, zinc, cadmium, or silver. In various embodiments, the transition metal cation is dicationic. For example, in particular embodiments, the transition metal cations are $Cu^{2+}$. For example, in some embodiments, the transition metal cations of the coordination polymer are at least 75% $Cu^{2+}$ ions, e.g., at least 90% $Cu^{2+}$ ions, or at least 95% $Cu^{2+}$ ions, or at least 99% $Cu^{2+}$ ions. In particular examples, the coordination polymer does not include any transition metal besides $Cu^{2+}$.

As described herein, the transition metal cations can carboxylate-bearing ligands come together to form a plurality of two-dimensional sheets. As would be understood by the person of ordinary skill in the art, the term "two-dimensional sheet" means that the sheet substructure extends without bound along two axes, but has a relatively small thickness, e.g., less than 10 nm, or less than 5 nm. Two-dimensional coordination polymers comprising metal ions and ligands are generally known in the art. In certain embodiments as otherwise described herein, the two-dimensional sheet is comprised of $Cu_2(pzdc)_2$ units.

As described herein, the plurality of pillars connect adjacent two-dimensional sheets, and include an alkaline earth metal. For example, in certain embodiments, the alkaline earth metal is beryllium, magnesium, calcium, strontium, or barium. In particular embodiments, the alkaline earth metal is beryllium, e.g., $Be^{2+}$. In other embodiments as otherwise described herein, the plurality of pillars may include a copper atom in place of an alkaline earth metal, for example, $Cu^{2+}$.

As described herein, each pillar includes at least one β-diketonate moiety. As would be understood by one of ordinary skill in the art, β-diketonate moieties are commonly known and have the generic formula:

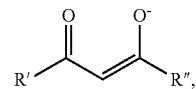

including associated resonance structures. One example of β-diketonates is acetylacetonate. Accordingly, in certain embodiments as otherwise described herein, the β-diketonate moieties are acetylacetonates. In particular examples, each pillar comprises $Be^{2+}$ (e.g., one $Be^{2+}$ cation) coordinated to two acetylacetonate-bearing ligands. The acetylacetonate-bearing ligands may include additional functional groups for coordination of species beyond the alkaline earth metal. For example, in certain embodiments as otherwise described herein, each acetylacetonate-bearing ligand further comprises an N-heterocycle, wherein each N-heterocycle is coordinated to a transition metal cation of the two-dimensional sheet (e.g., the at least one nitrogen atom of the N-heterocycle is coordinated to the transition metal cation). In particular embodiments as otherwise described herein, the N-heterocycle is imidazole, pyridine, pyrazine, or pyrimidine (e.g., is pyridine). For example, in certain embodiments as otherwise described herein, the acetylacetonate-bearing ligand is 3-(4-pyridryl)pentane-2,4-dionate (referred to herein as pyac). In such embodiments, and wherein the alkaline earth metal is Be, each pillar may have the structure:

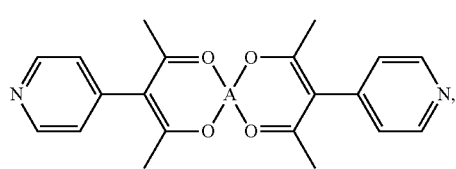

(I)

wherein A is an alkaline earth metal as otherwise described herein. In certain embodiments, the alkaline earth metal is Be, and each pillar has the structure:

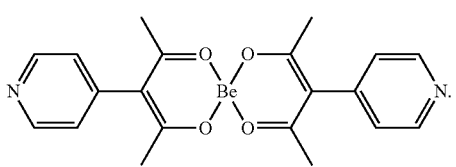

(II)

In particular embodiments, the nitrogen atom of each pyridine of structure I and/or structure II is coordinated to a transition metal cation of a two-dimensional sheet. In other embodiments, wherein the plurality of pillars include a copper atom, each pillar has the structure:

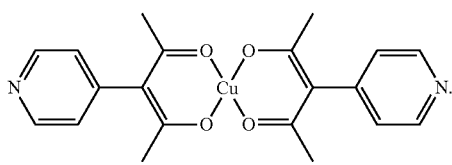

Accordingly, in particular embodiments as otherwise described herein, the coordination polymer has a formula $Cu_2(pzdc)_2[Be(pyac)_2]$ wherein $Cu_2(pzdc)_2$ forms the two-dimensional sheets, and $(Be(pyac)_2)$ form the pillars, and where the pyridyl moiety of each pyac ligand is coordinated to a copper atom of a two-dimensional sheet. For example, in particular embodiments, the copper atom is a $Cu^{2+}$ cation. As would be understood by the person of ordinary skill in the art, the coordination polymer formulae recited herein may represent only a portion of the coordination polymer, which may include additional structural elements, and/or bound or unbound solvents or analytes.

Figure 2:
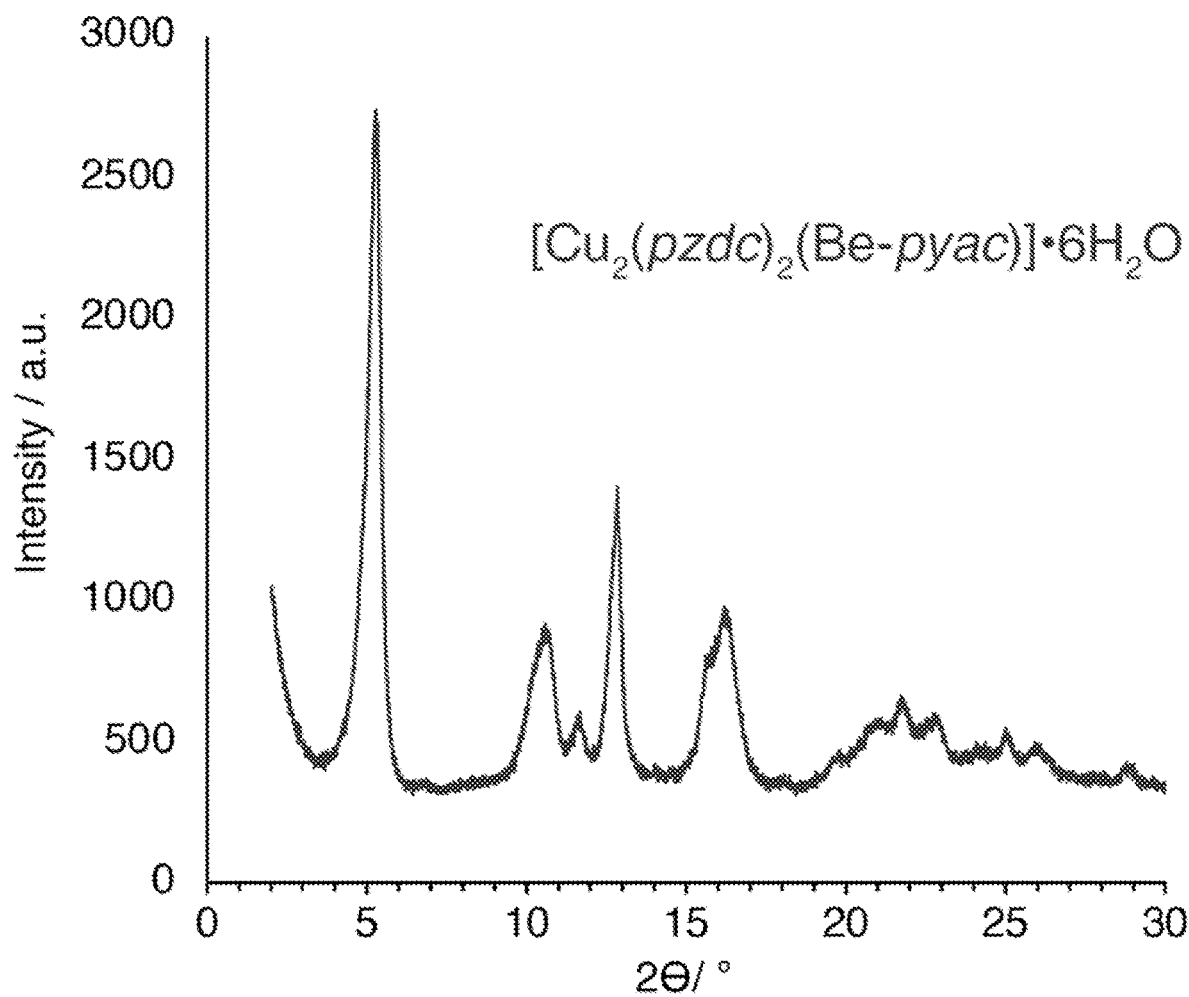
FIG. 2: X-ray diffraction pattern of as-synthesized $Cu_2(pzdc)_2(Be(pyac)_2)$.
Figure 9:
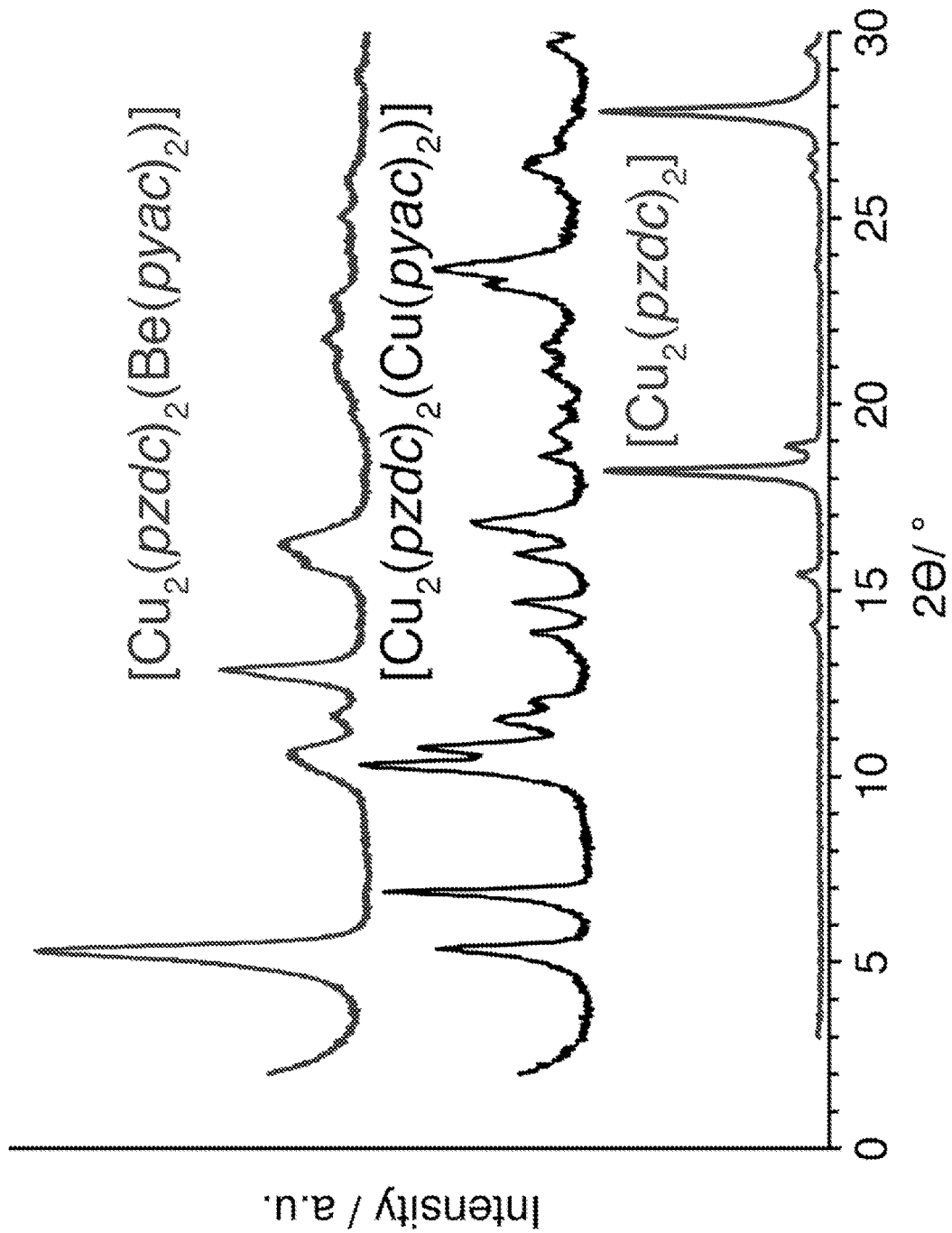
FIG. 9: X-ray diffraction patterns of $Cu_2(pzdc)_2(Be(pyac)_2)$, $Cu_2(pzdc)_2(Cu(pyac)_2)$, and $Cu_2(pzdc)_2$.

As known in the art, coordination polymers are often crystalline, and in such cases their structure can be elucidated through single crystal and/or powder X-ray diffraction techniques. In various embodiments as otherwise described herein, the coordination polymer is crystalline (e.g., the coordination polymer exhibits at least two, or at least three, or at least four well-defined peaks on an X-ray diffractogram, such as a powder X-ray diffractogram). Representative powder X-ray diffractograms of particular embodiments of the present disclosure are discussed in the Examples and displayed, for example, in FIGS. 2, 4, and 9. Accordingly, in certain embodiments as otherwise described herein, the coordination polymer provides a powder X-ray diffraction pattern as displayed in at least one of FIG. 2, FIG. 4, and FIG. 9, for example, as displayed in FIG. 2.

The present inventors have surprisingly found that the disclosed coordination polymers possess excellent physical properties which are desirable for their potential utilization as robust and efficient gas adsorbents. Of particular importance is thermal stability. One technique in order to adsorb and desorb gases in porous materials is temperature swing adsorption, whereby gas is adsorbed at low temperatures and then the material heated to desorb and release the gas. In order for a material to be suitable for temperature swing adsorption, it must be able to survive elevated temperatures. Accordingly, in certain embodiments as otherwise described herein, the coordination polymer is thermally stable at a temperature of at least 200° C., e.g., at least 210° C., or at least 225° C., or at least 240° C., or at least 250° C. Thermal stability may be assessed through methods known in the art, including through thermogravimetric analysis or in situ high temperature X-ray diffraction.

Advantageously, the present inventors have identified coordination polymers which can possess significant internal surface area, e.g., through the presence of micropores. This internal surface area allows for a coordination polymer to interact with relatively large amounts of gas per unit mass and allows a gas sample to access internal surfaces for adsorption. Accordingly, in certain embodiments as otherwise described herein, the coordination polymer has an internal surface area of at least 150 $m^2/g$, e.g., at least 175 $m^2/g$, or at least 200 $m^2/g$, or at least 225 $m^2/g$, or at least 250 $m^2/g$, or at least 275 $m^2/g$. In various embodiments, the coordination polymer as otherwise described herein has an internal surface area of no more than 1000 $m^2/g$, e.g., no more than 750 $m^2/g$, or no more than 500 $m^2/g$. The BET surface area, pore volume, pore size distribution and average pore radius may be determined from the nitrogen adsorption isotherm determined at 77K using a gas adsorption analyzer and data treated according to Brunauer, S, Emmett, P H, & Teller, E, J. Amer. Chem. Soc. 60, 309, (1938).

In order to efficiently be used as a $CO^2$ adsorbent, it is desirable that the material exhibits a selectivity for $CO^2$ over other gases, such as $N^2$. This selectivity enables efficient separation of $CO^2$ from a gaseous mixture in instances where the mixture includes additional competing gases. Accordingly, in certain embodiments as otherwise described herein, the coordination polymer has an adsorption selectivity toward $CO_2$ over $N_2$ of at least 40 on a molar basis, for example, at least 50, or at least 60, or at least 70 on a molar basis.

Advantageously, the coordination polymer as otherwise described herein may exhibit an energy of adsorption towards $CO_2$. This energy is released when $CO_2$ is adsorbed and must be input into the system during subsequent $CO_2$ release. As such, a low energy of adsorption leads to poor $CO_2$ uptake, while an energy that is too high makes $CO_2$ release and material generation energetically costly. Accordingly, in certain embodiments as otherwise described herein, the coordination polymer has a $CO_2$ adsorption energy in the range of 20 kJ/mol to 50 kJ/mol, e.g., in the range of 25 kJ/mol to 45 kJ/mol, or in the range of 30 kJ/mol to 45 kJ/mol.

In another aspect, the present disclosure provides for a method of making a coordination polymer, the method comprising:
  providing an alkaline earth metal-containing compound comprised of an alkaline earth metal coordinated to at least one β-diketonate moiety;
  in a solvent, mixing the alkaline earth metal-containing compound with a carboxylate-bearing ligand, where the carboxylate-bearing ligand may be protonated or a salt;
  adding a transition metal salt and allowing the mixture to react.

A variety of alkaline earth metals may be used. For example, in certain embodiments, the alkaline earth metal Be, Mg, Ca, Sr, or Ba. In particular embodiments, the alkaline earth metal is $Be^{2+}$. In some embodiments, the alkaline earth metal-containing compound is $Be(pyac)_2$.

A variety of solvents may be used in the method as disclosed herein. For example, in certain embodiments as otherwise described herein, the solvent comprises an alcohol, e.g., methanol or ethanol. In particular embodiments, the solvent may be a solvent mixture, for example, a combination of an alcohol and water (e.g., methanol and water).

Any suitable transition metal salt may be used. Examples of suitable anions include halides, nitrate, sulfate, trifluoromethanesulfonate, carbonate, acetate, perchlorate, and phosphate. Other suitable anions will be apparent to the person of ordinary skill in the art. In certain embodiments as otherwise described herein, the transition metal salt is a nitrate, sulfate, or perchlorate salt (e.g., a perchlorate salt).

The reaction to form the coordination polymer may be adjusted by the person of ordinary skill in the art. For example, in certain embodiments as otherwise described herein, the transition metal salt as otherwise described herein is allowed for react for a time in the range of 0.1 hr to 7 days. The skilled person may undertake additional process steps in order to isolate and/or purify the coordination polymer. For example, in certain embodiments as otherwise described herein, the method further comprises filtering the reaction to isolate a solid residue, washing the solid residue with a solvent, and drying the solid residue to obtain the coordination polymer.

In another aspect, the present disclosure provides for a method of adsorbing carbon dioxide, the method comprising:
  providing the coordination polymer as otherwise described herein; and
  contacting the coordination polymer with a gaseous mixture, where the gaseous mixture comprises $CO_2$, and wherein the coordination polymer uptakes at least a portion of the $CO_2$ in the gaseous mixture.

Advantageously, the gaseous mixture may comprise relatively low amounts of carbon dioxide. In general, adsorption from gaseous mixtures with low $CO_2$ loadings is difficult with conventional materials, as the release of gas is entropically favored. The present inventors have determined that the coordination polymers as otherwise described herein may be used for isolation of $CO_2$ from gaseous mixtures which contain relatively low amounts of $CO_2$. For example, in certain embodiments as otherwise described herein, the gaseous mixture includes no more than 50 vol. % $CO_2$, e.g., no more than 25 vol. % $CO_2$, or no more than 10 vol. % $CO_2$, or no more than 5 vol. % $CO_2$, or no more than 2 vol. % $CO_2$. In particular embodiments, the gaseous mixture comprises $CO_2$ in the range of 1 ppm to 1000 ppm. Additionally or alternatively, the coordination polymer may be used to adsorb $CO_2$ from point-source emissions, such as factories or power plants, from effluent gas which has a relatively high amount of $CO_2$. In certain embodiments as otherwise described herein, the gaseous mixture comprises at least 25 vol. % $CO_2$, e.g., at least 30 vol. % $CO_2$, or at least 50 vol. % $CO_2$, or at least 75 vol. % $CO_2$, or at least 90 vol. % $CO_2$, or at least 99 vol. % $CO_2$. In particular embodiments, the gaseous mixture is substantially pure $CO_2$.

The gaseous mixture may include components besides $CO_2$. For example, in certain embodiments as otherwise described herein, the gaseous mixture further comprises $N_2$, $O_2$, $CH_4$, $H_2O$, or Ar. For example, in particular embodiments, the gaseous mixture comprises at least 50 vol. % $N_2$, or at least 60 vol. % $N_2$, or at least 70 vol. % $N_2$. In some embodiments, the gaseous mixture comprises air, flue gas, biogas, natural gas, or shale gas. In some embodiments, the gaseous mixture has a composition similar to air, e.g., is air that has been subjected to a pre-treatment or is air, such as untreated air.

Before use, the coordination polymer may require a pre-activation. Without wishing to be bound by theory, pre-activation is thought to remove unwanted molecules, such as leftover solvent, from the polymer pores in order to allow for gaseous uptake. Accordingly, in certain embodiments as otherwise described herein, the coordination polymer has been pre-activating through exposure to vacuum, inert gas, elevated temperature, or a combination thereof. For example, in certain embodiments, the coordination polymer is subjected to an elevated temperature of at least 60° C., or in the range of 80° C. to 200° C., optionally in combination with reduced pressure.

Typically, gas uptake is performed at relatively low temperatures. Thus, in certain embodiments as otherwise described herein, the contacting is performed at a temperature in the range of 0° C. to 25° C. Typically, gaseous uptake may be performed at any pressure, for example, at a pressure in the range of 0.1 atm to 5 atm. Without wishing to be bound by theory, it is presently believed that the $CO_2$ uptake proceeds through physiosorption of $CO_2$ to the coordination polymer. Further, the inclusion of Be in particular embodiments may lead to an enhanced interaction through interaction between $CO_2$ and Be centers.

After gas uptake, the gas may be stored in the coordination polymer, and optionally transported to a location for further storage or disposal. In some embodiments, the gas is liberated from the coordination polymer in order to regenerate the coordination polymer for subsequent use. Accordingly, in certain embodiments as otherwise described herein, the method comprises subjected the coordination polymer to decreased pressure to release at least a portion of $CO_2$. For example, in some embodiments, the decreased pressure is a pressure less than the pressure of the contacting of the gaseous mixture, e.g., at least 0.1 atm less. Additionally or alternatively, in certain embodiments, the method further comprises subjected the coordination polymer to elevated temperature to release at least a portion of $CO_2$. In such embodiments, for example, the elevated temperature is a temperature greater than the temperature of the contacting, e.g., at least 10° C. greater.

EXAMPLES

The Examples that follow are illustrative of specific embodiments of the disclosure, and various uses thereof. They are set forth for explanatory purposes only and should not be construed as limiting the scope of the disclosure in any way.

A $Cu_2(pzdc)_2(Be(pyac)_2)$ [Be(pyac)$_2$: Bis[3-(4-pyridyl)pentane-2,4-dionato]beryllium(II)] PCP was assembled for the first time, using pzdc layers and 3-(4-pyridyl)pentane-2,4-dione (Hpyac) based ligands.

The latter was transformed into Be(pyac)$_2$ prior to its use for the assembly of the porous $Cu_2(pzdc)_2(Be(pyac)_2)$. A schematic representation of the PCP assembly if shown in FIG. 1. Na$_2$pzdc (0.159 g, 0.75 mmol) and Be(pyac)$_2$ (0.183 g, 0.51 mmol) were dissolved in MeOH:H$_2$O (2:1, v:v, 45 mL) and stirred for 30 minutes. To this, an aqueous solution (30 mL) of Cu(ClO$_4$)$_6$H$_2$O (0.279 g, 0.75 mmol) was added dropwise at ambient temperature while stirring, and the reaction was continued for 1 day. The precipitate was isolated by filtration and the filter cake was gently rinsed with large amount of MeOH to remove unreacted impurities. The blue powder was dried under vacuum at 313 K until reaching constant weight. Yield=0.296 g. The elemental analysis is calculated for $C_{32}H_{24}Cu_2BeN_6O_{12} \cdot 5H_2O$, (% wt) C 42.20, H 3.76, N 9.23, Cu 13.95, Be 0.990; found 43.32, 3.26, 9.59, 15.00, 0.977.

Surprisingly, it was determined that the compound could only be assembled in a solution containing an alcohol, and not in other solvent systems. Additionally, to ensure the bi-metallic nature of the PCP in this invention, the order of addition of the reactants during the synthesis was found to play a major role. As Cu(II) exhibits a high degree of coordination, Be(pyac)$_2$ and Na$_2$(pzdc) were mixed first, followed by addition of the Cu(II) source. The crystallinity and periodicity of the $Cu_2(pzdc)_2(Be(pyac)_2)$ structure is evident in the X-ray diffractions pattern shown in FIG. 2 and FIG. 9.

Figure 3:
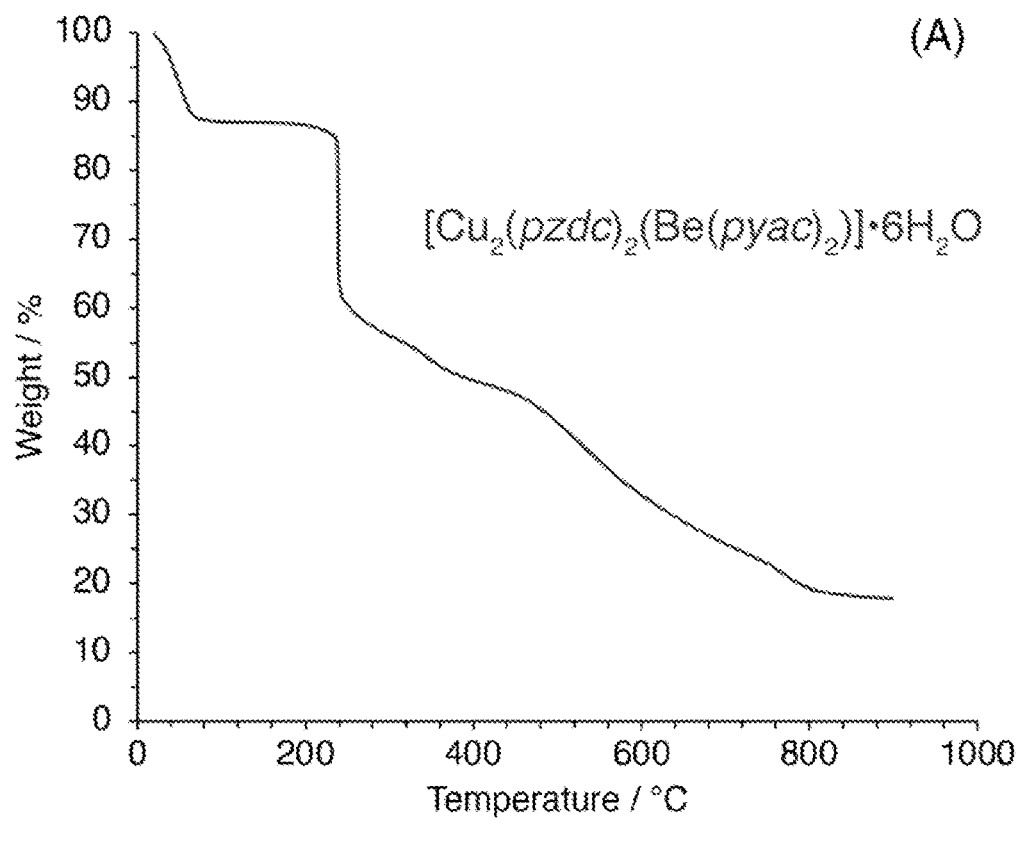
FIG. 3: (A) Thermal gravimetric analysis profile for as-synthesized $Cu_2(pzdc)_2(Be(pyac)_2)$ gathered under a nitrogen gas balance and a heating ramp of 10° C. (B) In situ high-temperature X-ray diffraction for $Cu_2(pzdc)_2(Be(pyac)_2)$.
Figure 3:
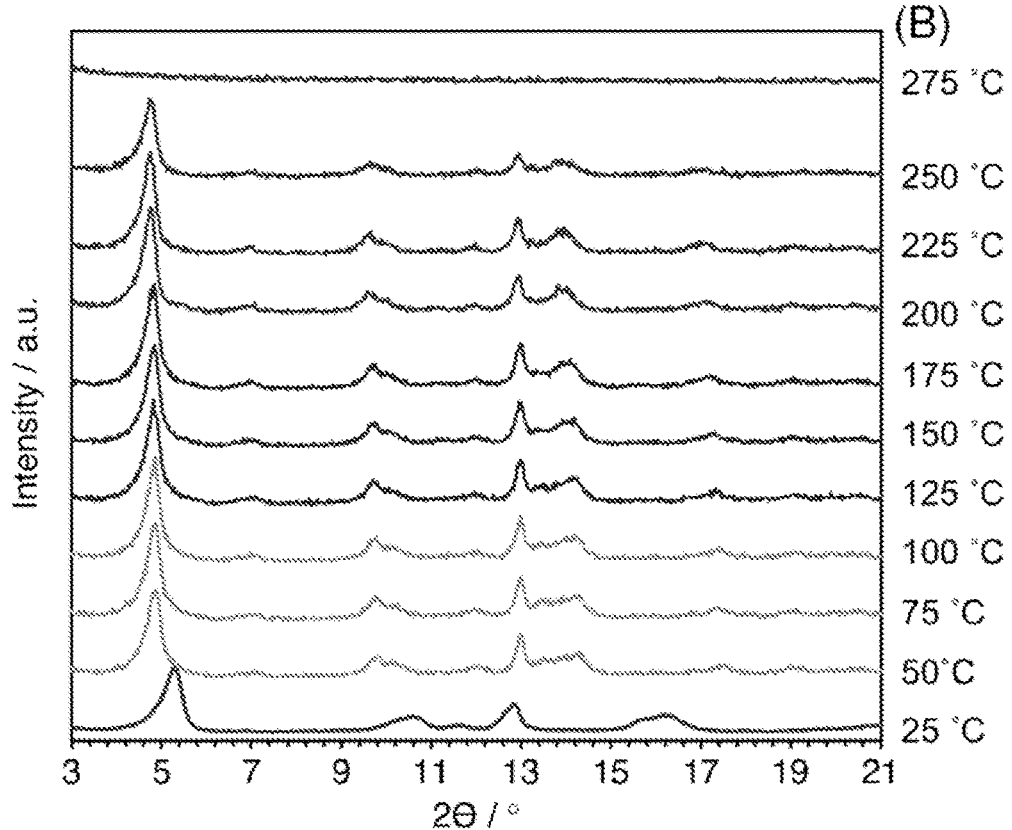
Figure 4:
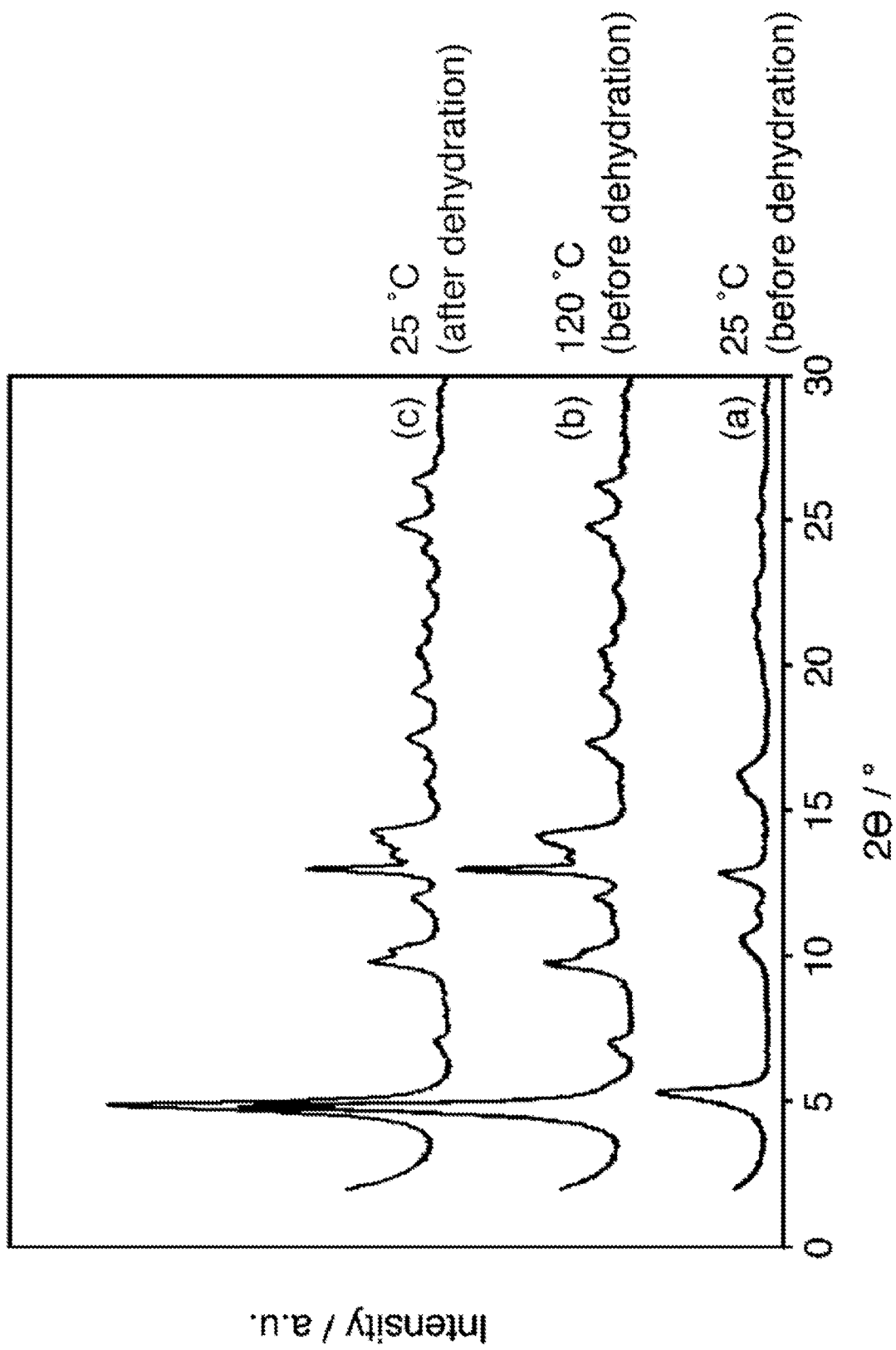
FIG. 4: In situ high-temperature X-ray diffraction for $Cu_2(pzdc)_2(Be(pyac)_2)$.

According to thermal gravimetric tests and in situ high temperature X-ray diffraction tests, $Cu_2(pzdc)_2(Be(pyac)_2)$ was found to be thermally stable at temperatures up to about 250° C. (FIG. 3). This stability is critical for pre-activation of the material, which involves a thermal treat, and also to accelerate regeneration of the PCP after being spent during a series of adsorption-desorption processes to separate gases. The data in FIG. 3B and FIG. 4 show the displacement of diffraction reflections to lower angles upon heat treatment, indicating that the sample structure and hence its pore system expanse (ca. 2 Å) upon elimination of physisorbed and tenacious water. This expanded pore structure was found to remain upon cooling of the sample in a dry atmosphere. This evidences that the PCP structure contracts or expands upon the presence of a guest species, such as an adsorbate.

Figure 5:
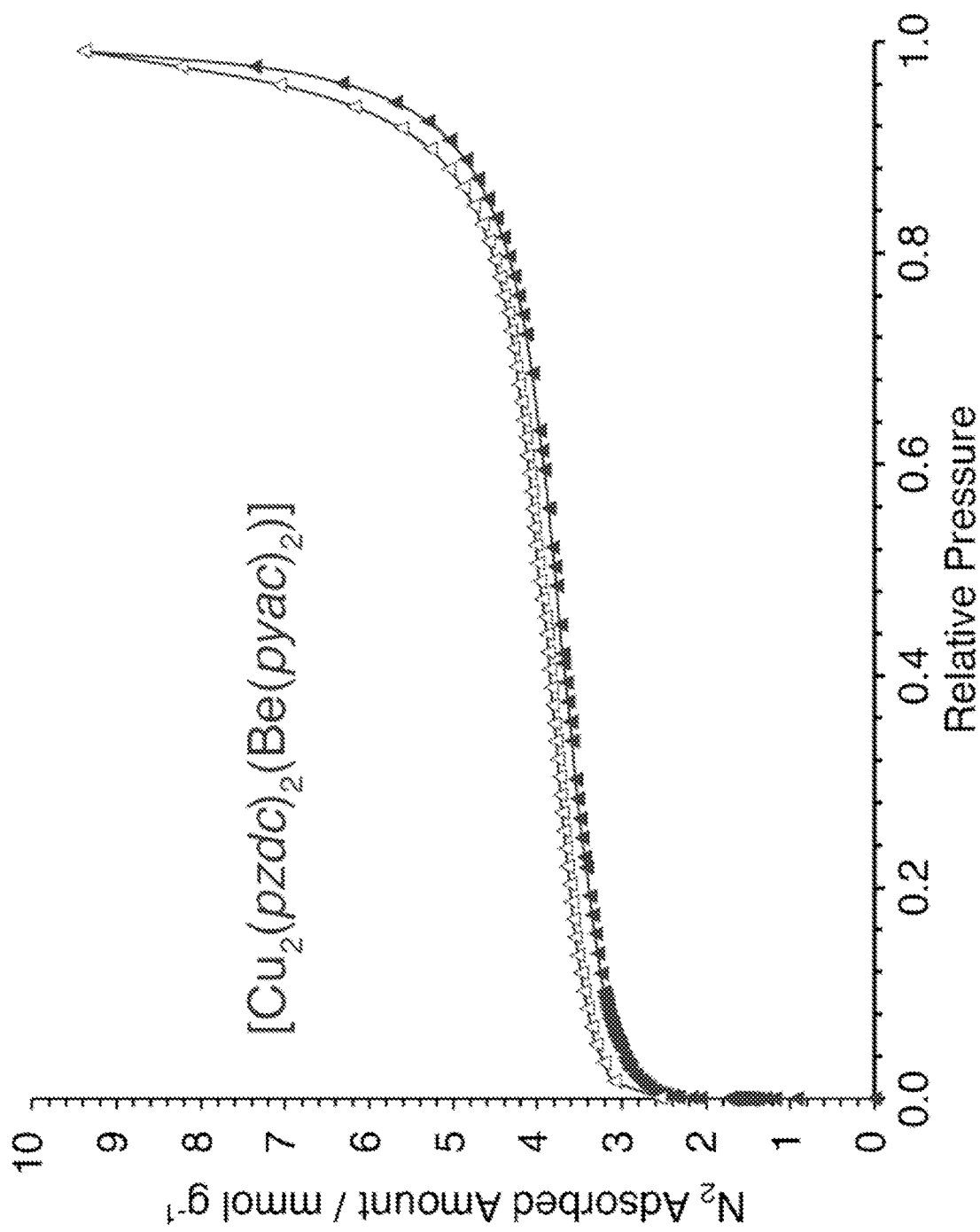
FIG. 5: Equilibrium adsorption (closed markers) and desorption (open markers) isotherms for $N_2$ onto $Cu_2(pzdc)_2(Be(pyac)_2)$ at −196° C.

In order to elucidate the textural properties as well as for gas uptake experiments, $Cu_2(pzdc)_2(Be(pyac)_2)$ was pre-activated in vacuum or inert gas at a temperature of about 100° C., which was found to be sufficient to remove water that is weakly bound to the surface of the PCP. Upon activation and adsorption of N$_2$ at −196° C., the material exhibits a Type I isotherm, which corresponds to a microporous system (FIG. 5). The surface area was estimated to be about 275 m$^2$/g.

Figure 6:
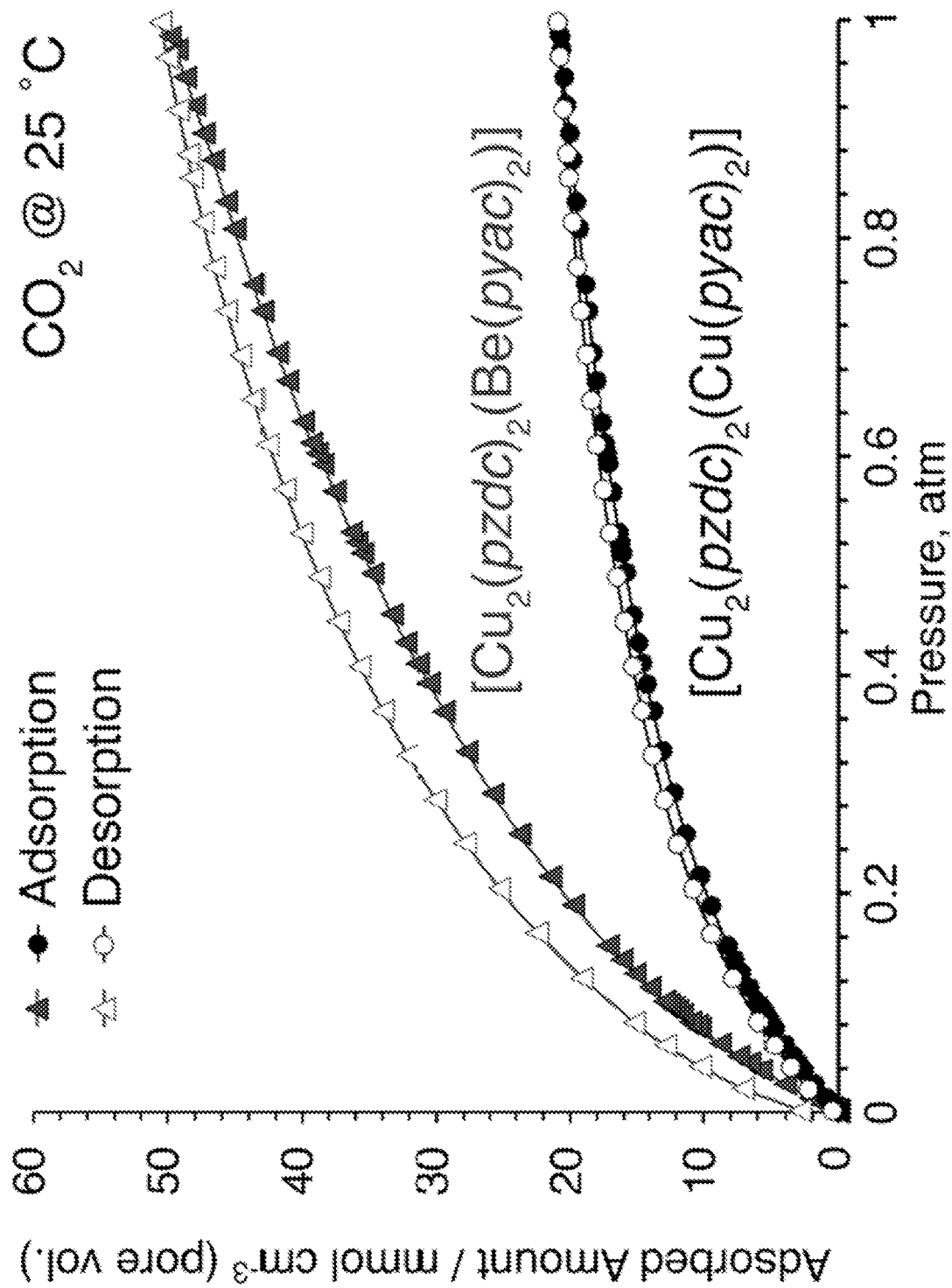
FIG. 6: Equilibrium adsorption (closed markers) and desorption (open markers) isotherms for $CO_2$ onto either $Cu_2(pzdc)_2(Be(pyac)_2)$ or $Cu_2(pzdc)_2(Cu(pyac)_2)$ at 25° C.
Figure 7:
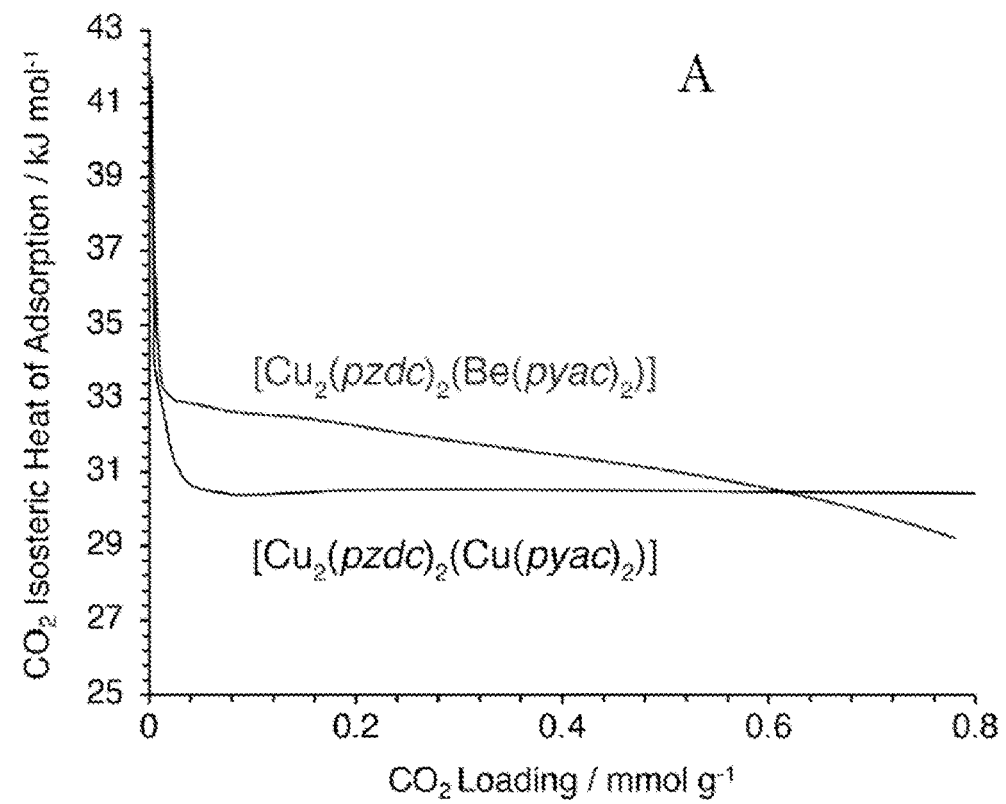
FIG. 7: $CO_2$ isosteric heat of adsorption ($\Delta H_{iso}$) profiles for $Cu_2(pzdc)_2(Be(pyac)_2)$ or $Cu_2(pzdc)_2(Cu(pyac)_2)$. Profiles shown as function of $CO_2$ loading per adsorbent mass (A) and pore volume (B).
Figure 7:
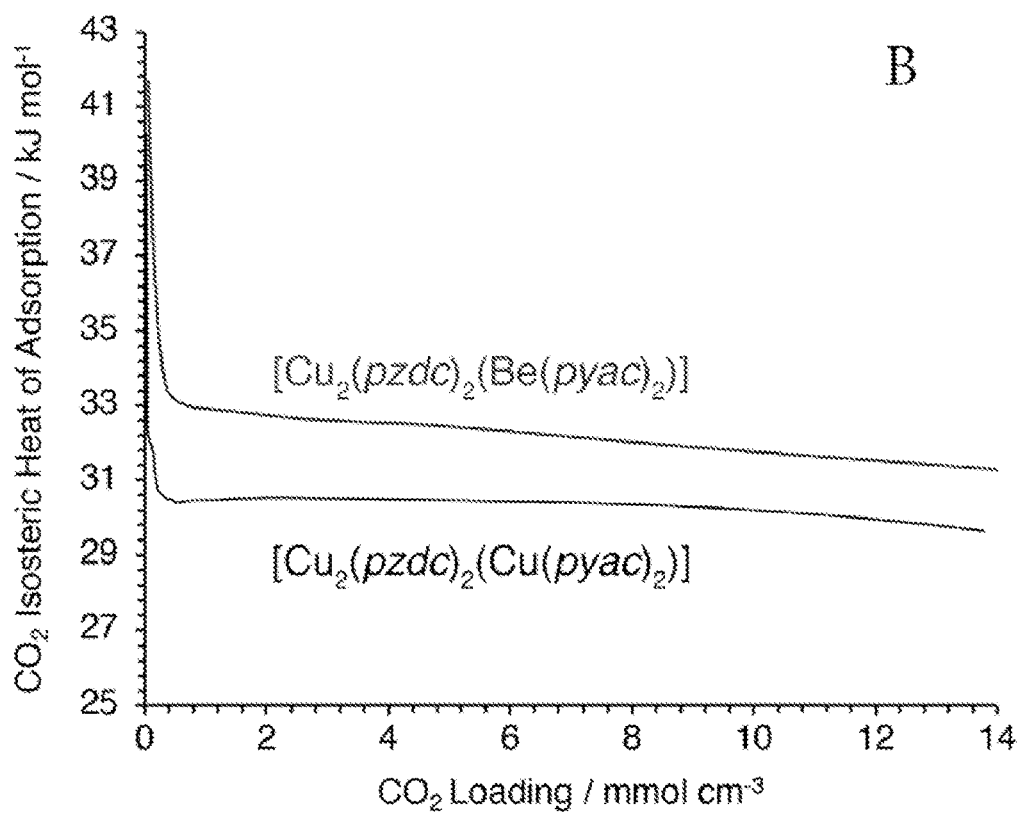

Carbon dioxide equilibrium adsorption tests were performed at 25° C. The data was captured for $Cu_2(pzdc)_2(Be(pyac)_2)$ and, as a control, $Cu_2(pzdc)_2(Cu(pyac)_2)$, also known as CPL-15.[32] FIG. 6 shows the comparative CO$_2$ uptake experiments between the two MOFs. The addition of beryllium nodes into the pillars was found to result in significant interactions with CO$_2$ adsorbates, increasing the uptake capacity per pore volume by almost 5-fold compared to the PCP material that contains only copper nodes across the framework. Without wishing to be bound by theory, this surprising enhancement is believed to be due to the inclusion to alkaline earth metal into the pillar, which can exhibit relatively strong metal-oxygen interactions, especially in comparison to many transition metals.

FIG. 6 shows isosteric heats of adsorption profiles indicating that the interactions with beryllium are sufficiently strong, yet within the realm of physisoption (i.e., there is no evidence of a chemical bonding interaction). This balance is essential to achieve effective regeneration of the adsorbent through simple and economic engineering means, such as thermal and/or vacuum swing desorption. It should also be noted that the presence of beryllium in the PCP framework also produced a slightly hysteretic CO$_2$ adsorption/desorption path. The observed hysteresis is minimal and reversibility is still achieved when completing the cycle. However, this observation is interesting in relation to the framework changes that also take place in the presence of beryllium that produce textural properties that offer enhanced CO$_2$ capacity on a per pore volume basis.

Figure 8:
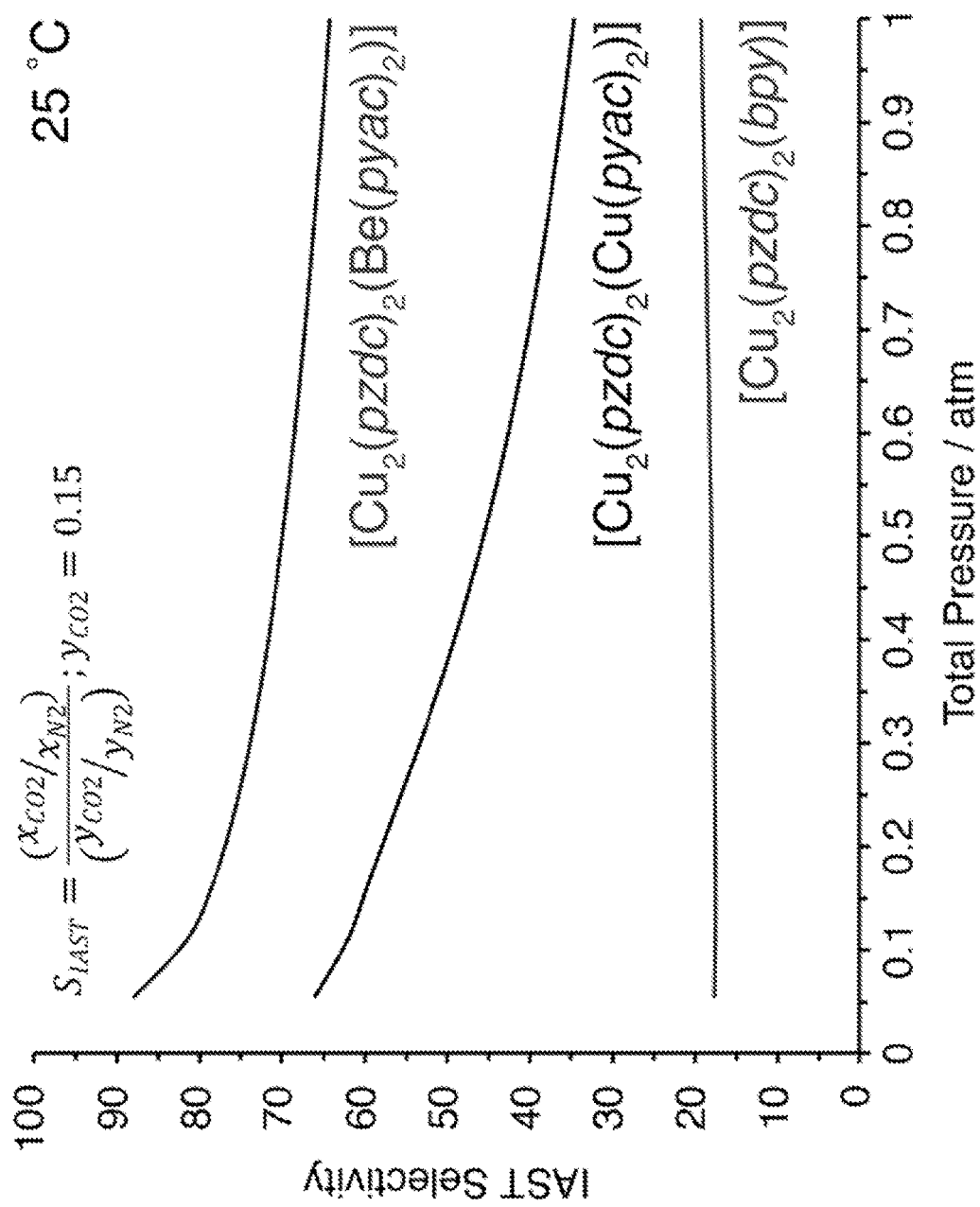
FIG. 8: Adsorption selectivity ($CO_2/N_2$) on either $Cu_2(pzdc)_2(Be(pyac)_2)$ or $Cu_2(pzdc)_2(Cu(pyac)_2)$ at 25° C. based on the Ideal Adsorbed Solution Theory (IAST) and single component equilibrium adsorption data for both adsorbates. Ratios shown are in molar basis.

FIG. 8 shows selectivity profiles for the separation of CO$_2$ over N$_2$ at 25° C., for a head space gaseous composition of 15 CO$_2$. Three PCPs were evaluated: $Cu_2(pzdc)_2(Be(pyac)_2)$, $Cu_2(pzdc)_2(Cu(pyac)_2)$ (i.e., CPL-15) and $Cu_2(pzdc)_2(bpy)$ (i.e., CPL-2). The PCP containing bpy lacks a metal site in the pillar structure that would be explored to the pore galleries and demonstrates lower CO$_2$ selectivity. The interactions between CO$_2$ in the absence of a surface electric field generated by a metal are not as significant and this leads to lower selectivity. On the other hand, the presence of a pillar ligand that exposes an alkaline earth metal site to the pore galleries is found to produce excellent CO$_2$ selectivity, twice that of the Cu-only PCP and almost 4× that of the traditional PCP.

While particular aspects and embodiments are disclosed herein, other aspects and embodiments will be apparent to those skilled in the art in view of the foregoing teaching. The various aspects and embodiments disclosed herein are for illustration purposes only and are not intended to be limiting, with the true scope and spirit being indicated by the following claims.

We claim:

1. A coordination polymer, comprising:
   a plurality of two-dimensional sheets, wherein the two-dimensional sheets are arranged in parallel, and each comprises a plurality of transition metal cations coordinated by carboxylate-bearing ligands; and
   a plurality of pillars, wherein each pillar connects two adjacent two-dimensional sheets, and wherein each pillar comprises an alkaline earth metal coordinated to at least one β-diketonate moiety.

2. The coordination polymer of claim 1, wherein the carboxylate-bearing ligands are dicarboxylates.

3. The coordination polymer of claim 1, wherein the carboxylate-bearing ligands comprise pyrazine.

4. The coordination polymer of claim 1, wherein the transition metal cations are cobalt, copper, nickel, zinc, cadmium, or silver.

5. The coordination polymer of claim 4, wherein the transition metal cations are $Cu^{2+}$.

6. The coordination polymer of claim 1, wherein the carboxylate-bearing ligands are pyrazine-2,3-dicarboxylate (pzdc) and wherein the two-dimensional sheet comprises $Cu_2(pzdc)_2$ units.

7. The coordination polymer of claim 1, wherein the alkaline earth metal is beryllium, magnesium, calcium, strontium, or barium.

8. The coordination polymer of claim 1, wherein each pillar comprises $Be^{2+}$ coordinated to two acetylacetonate-bearing ligands.

9. The coordination polymer of claim 8, wherein each acetylacetonate-bearing ligand further comprises an N-heterocycle, wherein each N-heterocycle is coordinated to a transition metal atom of an adjacent two-dimensional sheet.

10. The coordination polymer of claim 9, wherein the N-heterocycle is imidazole or pyridine and wherein the acetylacetonate-bearing ligand is 3-(4-pyridyl) pentane-2,4-dionate.

11. The coordination polymer of claim 1, wherein the coordination polymer has a formula $[Cu_2(pzdc)_2(Be(pyac)_2]$, wherein $Cu_2(pzdc)_2$ forms the two-dimensional sheets and $(Be(pyac)_2)$ forms the pillars, and wherein the pyridyl moiety of each pyac ligand is coordinated to a $Cu^{2+}$ cation of a two-dimensional sheet.

12. The coordination polymer of claim 1, wherein the coordination polymer has an adsorption selectivity toward $CO_2$ over $N_2$ of at least 50 on a molar basis.

13. The coordination polymer of claim 1, wherein the coordination polymer has a $CO_2$ adsorption energy in the range of 20 to 50 KJ/mol.

14. A method of making a coordination polymer, the method comprising:

providing an alkaline earth metal-containing compound comprising an alkaline earth metal coordinated to at least one β-diketonate moiety;

in a solvent, mixing the alkaline earth metal-containing compound with a carboxylate-bearing ligand, where the carboxylate-bearing ligand may be protonated or a salt;

adding a transition metal salt and allowing the mixture to react.

15. The method of claim 14, wherein the solvent comprises an alcohol.

16. A method of adsorbing carbon dioxide, the method comprising:

providing the coordination polymer of claim 1;

contacting the coordination polymer with a gaseous mixture, wherein the gaseous mixture comprises $CO_2$, and wherein the coordination polymer uptakes at least a portion of the $CO_2$ in the gaseous mixture.

17. The method of claim 16, wherein the gaseous mixture comprises no more than 50 vol. % $CO_2$.

18. The method of claim 16, wherein the gaseous mixture comprises air, flue gas, biogas, natural gas, or shale gas.

19. The method of claim 16, wherein the coordination polymer has been pre-activated through exposure to reduced pressure, inert gas, a temperature of at least 60° C., or a combination thereof.

20. The method of claim 16, further comprising subjecting the coordination polymer to a pressure less than the pressure at which the contacting was performed, to a temperature greater than the temperature at which the contacting was performed, or to a combination thereof to release at least a portion of the uptaken $CO_2$.

\* \* \* \* \*